(12) United States Patent
Fehrenbach et al.

(10) Patent No.: US 12,238,682 B2
(45) Date of Patent: Feb. 25, 2025

(54) TRANSCEIVERS AND METHODS FOR OPERATING THE SAME

(71) Applicant: Fraunhofer-Gesellschaft zur Förderung der angewandten Forschung e.V., Munich (DE)

(72) Inventors: Thomas Fehrenbach, Berlin (DE); Baris Göktepe, Berlin (DE); Cornelius Hellge, Berlin (DE); Thomas Wirth, Berlin (DE); Thomas Schierl, Berlin (DE); Sarun Selvanesan, Berlin (DE); Roya Ebrahim Rezagah, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 676 days.

(21) Appl. No.: 17/490,319

(22) Filed: Sep. 30, 2021

(65) Prior Publication Data
US 2022/0030554 A1 Jan. 27, 2022

Related U.S. Application Data

(63) Continuation of application No. PCT/EP2020/059252, filed on Apr. 1, 2020.

(30) Foreign Application Priority Data

Apr. 2, 2019 (EP) .................................... 19166918

(51) Int. Cl.
*H04W 72/02* (2009.01)
*H04W 72/12* (2023.01)
*H04W 4/40* (2018.01)

(52) U.S. Cl.
CPC .......... *H04W 72/02* (2013.01); *H04W 72/12* (2013.01); *H04W 4/40* (2018.02)

(58) Field of Classification Search
CPC ........ H04W 72/02; H04W 72/12; H04W 4/40
See application file for complete search history.

(56) References Cited

U.S. PATENT DOCUMENTS 9,401,736 B2 7/2016 Suzuki et al.
2012/0122463 A1 5/2012 Chen et al.
(Continued)

FOREIGN PATENT DOCUMENTS

CN 109076607 A 12/2018
EP 1 627 537 A1 2/2006
(Continued)

OTHER PUBLICATIONS

Japanese language office action dated Oct. 16, 2022, issued in application No. JP 2021-559150.
(Continued)

*Primary Examiner* — Ajay Cattungal
(74) *Attorney, Agent, or Firm* — McClure, Qualey & Rodack, LLP

(57) ABSTRACT

A transceiver configured for communicating in a wireless communication network being operated so as to schedule communication in a communication channel being organized in a plurality of resources; is configured for performing long-term sensing an utilization of the channel by decoding a data traffic; for estimating a usability of resources of the channel for an own transmission based on the decoding; and for scheduling the own transmission based on the usability of the resources.

18 Claims, 5 Drawing Sheets

(56) References Cited

U.S. PATENT DOCUMENTS

| | | | |
|---|---|---|---|
| 2013/0054863 A1* | 2/2013 | Imes | H04L 47/70 |
| | | | 709/223 |
| 2014/0141789 A1* | 5/2014 | Tarokh | H04W 4/02 |
| | | | 455/450 |
| 2016/0174217 A1* | 6/2016 | Salem | H04W 16/14 |
| | | | 455/454 |
| 2017/0071007 A1 | 3/2017 | Wang et al. | |
| 2018/0199369 A1* | 7/2018 | Larsson | H04W 72/23 |
| 2019/0090245 A1 | 3/2019 | Ansari et al. | |
| 2020/0077434 A1* | 3/2020 | Kim | H04W 72/0446 |

FOREIGN PATENT DOCUMENTS

| | | |
|---|---|---|
| EP | 2 918 125 A1 | 9/2015 |
| JP | 2011-142401 A | 7/2011 |
| WO | 2014/045402 A1 | 3/2014 |
| WO | 2015/160821 A1 | 10/2015 |
| WO | 2017/196247 A1 | 11/2017 |
| WO | 2018/125686 A2 | 7/2018 |

OTHER PUBLICATIONS

English language translation of office action dated Oct. 16, 2022, issued in application No. JP 2021-559150 (pp. 1-7 of attachment).

Sony; "Discussion on NR V2X resource allocation mechanism;" 3GPP TSG RAN WG1 #96 R1-1902175; Mar. 2019; pp. 1-6.

Intel Corporation; "Resource Allocation Schemes for NR Communication;" 3GPP TSG RAN WG1 #96 R1-1902484; Mar. 2019; pp. 1-18.

Intel Corporation; "Transmitter behavior for sidelink resource (re)selection;" 3GPP TSG-RAN WG1#86 R1-166512; Aug. 2016; pp. 1-7.

Ericsson; "On Mode 2 Resource Allocation for NR Sidelink;" 3GPP TSG RAN WG1 #95 R1-1813641; Nov. 2018; pp. 1-13.

International Search Report and Written Opinion dated Aug. 14, 2020, issued in application No. PCT/EP2020/059252.

"3GPP TS 36.213 V15.5.0 (Mar. 2019), 3rd Generation Partnership Project; Technical Specification Group Radio Access Network; Evolved Universal Terrestrial Radio Access (E-UTRA); Physical layer procedures (Release 15);" section 14.1.1.6; Mar. 2019; pp. 1-11.

"3GPP TR 38.804 V14.0.0 (Mar. 2017), 3rd Generation Partnership Project; Technical Specification Group Radio Access Network; Study on New Radio Access Technology; Radio Interface Protocol Aspects (Release 14);" Mar. 2017; pp. 1-57.

Chinese language office action dated Jan. 26, 2024, issued in application No. CN 202080033163.3.

English language translation of office action dated Jan. 26, 2024 (pp. 1-10 of attachment).

Korean language office action dated Feb. 22, 2024, issued in application No. KR 10-2021-7035794.

English language translation of office action dated Feb. 22, 2024 (pp. 1-24 of attachment).

CAICT; "Considerations on Resource Allocation of NR V2X Sidelink;" 3GPP TSG RAN WG1 #94; Aug. 2018; pp. 1-6.

International Search Report and Written Opinion dated Aug. 14, 2020, issued in application No. PCT/EP2020/059252 (copy already provided).

3GPP TR 36.785 V14.0.0; "3rd Generation Partnership Project; Technical Specification Group Radio Access Network; Vehicle to Vehicle (V2V) services based on LTE sidelink; User Equipment (UE) radio transmission and reception (Release 14);" Oct. 2016; pp. 1-57.

3GPP TR 38.885 V16.0.0; "3rd Generation Partnership Project; Technical Specification Group Radio Access Network; NR; Study on NR Vehicle-to-Everything (V2X) (Release 16);" Mar. 2019; pp. 1-109.

Indian language office action dated Apr. 6, 2022, issued in application No. IN 202117044262 (including English language translation).

* cited by examiner

TRANSCEIVERS AND METHODS FOR OPERATING THE SAME

CROSS-REFERENCES TO RELATED APPLICATIONS

This application is a continuation of copending International Application No. PCT/EP2020/059252, filed Apr. 1, 2020, which is incorporated herein by reference in its entirety, and additionally claims priority from European Application No. EP 19 166 918.3, filed Apr. 2, 2019, which is incorporated herein by reference in its entirety.

The present invention relates to transceivers and methods for operating the same. The present application in particular relates to the field of wireless communication systems or networks such as to new radio (NR), more specifically to approaches for a wireless communication among user devices for a wireless communication system. The present application further relates to new radio vehicle-to-everything (V2X) Advanced Sensing Mechanisms.

BACKGROUND OF THE INVENTION

The initial vehicle-to-everything (V2X) specification was included in Release 14 of the 3GPP standard. The scheduling and assignment of resources has been modified according to the V2X requirements, while the original device-to-device (D2D) communication standard has been the basis of the design. Release 15 of the LTE V2X standard (also known as enhanced V2X) was completed in June 2018, and now the Study Item for NR V2X for Release 16 of the 3GPP standard has agreed to proceed with the concept of sensing in order to determine resources to the use for communications.

The sensing procedure in LTE V2X was designed to be carried out by user equipment (UEs), especially when out-of-coverage, in order to determine the resources to be used.

In the Study Item phase of Rel. 16 in NR V2X, it has been identified that new sensing schemes have to be introduced in order to meet the requirements as well as cater to both periodic and aperiodic traffic. The existing sensing scheme when a UE is operating out-of-coverage and in an autonomous mode (Mode 4 in LTE and Mode 2 in NR) dictates that within a defined sensing window, the UE will carry out sensing based on the received signal power to decide whether a given resource is occupied. Resources are then selected by comparing the received signal power to a pre-defined threshold in order to decide its occupancy status. This is specified in 36.213 in section 14.1.1.6: UE procedure for determining the subset of resources to be reported to higher layers in PSSCH (physical sidelink shared channel) resource selection in sidelink transmission mode 4.

The received signal measure is an indicator on how many resources are occupied at a given time slot. It is possible that the UE is still able to use a resource already being used by other UEs since the resource in a time slot spans multiple resource blocks or sub-channels across frequencies.

In the case where a UE cannot determine the amount of resources that may be used within the pre-defined threshold, it will increase the threshold value by 3 dB and repeat the sensing process. The increase of the threshold leads to the case that the same free resources are again identified as free but it may also identify additional resources as free. This repeated increase of threshold and sensing process is repeated until the UE secures the number of resources that may be used.

The drawback of this scheme is that the UE does not segregate the resources after increasing the threshold, even though it is aware that other UEs are using it and the additional ones are of a lower quality than the initial ones with the non-increased threshold. All these resources that are selected eventually are put into the same set of available resources, immaterial of whether the received power measured on these resources were higher in one and lower in another.

In the Rel. 16 Study Item, it was also suggested that long-term sensing is to be used for a selection of resources for a periodic transmission, and short-term sensing (or a combination of the two) for a selection of resources for aperiodic transmissions. Long-term sensing is similar to the sensing procedure followed in LTE, where a UE, in order to determine resources for transmission in Mode 2, would sense over a long period of time (1000 milliseconds in LTE). Short-term sensing is similar to Listen-Before-Talk (LBT), where the UE would listen to the resource it intends to transmit in for a random and short period of time, before determining if it is available or not.

There is a need for reliable communication, especially for high priority transmissions.

SUMMARY

An embodiment may have a transceiver configured for communicating in a wireless communication network being operated so as to schedule communication in a communication channel being organized in a plurality of resources arranged in a time-frequency grid; wherein the transceiver is configured for estimating a usability of resources of the channel for an own transmission based on performing long-term sensing an utilization of the channel by decoding a control data transmitted in the channel and/or by performing power sensing of the channel; and scheduling the own transmission based on the usability of the resources.

Another embodiment may have a transceiver configured for communicating in a wireless communication network being operated so as to schedule communication in a communication channel being organized in a plurality of resources arranged in a time-frequency grid; wherein the transceiver is configured for performing long-term sensing an utilization of the channel by decoding a control data transmitted on the channel;
    estimating a usability of resources of the channel for an own transmission based on the decoding; and scheduling the own transmission based on the usability of the resources.

Another embodiment may have a wireless communication network being operated so as to schedule communication in a communication channel being organized in a plurality of resources, the wireless communication network including: at least one transmitter accessing the channel; and at least one inventive transceiver or a transceiver configured for communicating in a wireless communication network being operated so as to schedule communication in a communication channel being organized in a plurality of resources arranged in a time-frequency grid; wherein the transceiver is configured for performing long-term sensing an utilization of the channel by decoding a control data transmitted on the channel; estimating a usability of resources of the channel for an own transmission based on the decoding; and scheduling the own transmission based on the usability of the resources.

Another embodiment may have a non-transitory digital storage medium having stored thereon a computer program having a program code for performing, when running on a computer, a method for operating a transceiver configured for communicating in a wireless communication network being operated so as to schedule communication in a communication channel being organized in a plurality of resources arranged in a time-frequency grid, the method having the steps of: estimating a usability of resources of the channel for an own transmission based on performing long-term sensing an utilization of the channel by decoding a control data transmitted in the channel and/or by performing power sensing of the channel; and scheduling the own transmission based on the usability of the resources.

The invention described herein is based, amongst other things, on the finding that by decoding control information that is transmitted using a channel, information can be obtained regarding a duration and/or a repetition rate or repetition pattern of transmissions. In particular, decoding allows for a transceiver-individual evaluation of traffic on the channel and may allow for a precise estimation or forecast with regard to future available resources comprising a transmission time interval and a plurality (at least one) of sub-channels. When compared to considering a sum or an overall-information over a plurality or even all sub-channels, a periodicity information and/or an estimate about future channel load may be obtained with high accuracy when evaluating an individual load generated by a transceiver.

According to an embodiment, a transceiver configured for communication in a wireless communication network being operated so as to schedule communication in a communication channel being organized in a plurality of resources arranged in a time-frequency grid. The transceiver is configured for estimating a usability of resources of the channel for an own transmission based on performing long-term sensing and/or detecting the utilization of the channel by decoding a control data transmitted in the channel and/or by performing short-term sensing, e.g. in a Listen-before-Talk manner, of the channel; and for scheduling the own transmission based on the usability of the resources. This may allow to use a high degree of information when considering decoded data.

According to an embodiment, a transceiver configured for communicating in a wireless communication network being operated so as to schedule communication in a communication channel being organized in a plurality of resources arranged in a time-frequency grid. The transceiver is configured for performing long-term sensing and/or decoding control data transmitted in the channel for estimating a usability of resources of the channel for an own periodic transmission. The transceiver is configured for performing short-term sensing for estimating a usability of a present resource for an own aperiodic transmission According to an embodiment, a transceiver configured for communicating in a wireless communication network being operated so as to schedule communication in a communication channel being organized in a plurality of resources arranged in a time-frequency grid. The transceiver is configured for estimating, from an utilization of the channel, an amount of resources available in a future time interval, e.g. slot or transmission time interval, and for selecting future resources from a plurality of future resources based on the estimated amount; for transmitting the data with a priority; wherein the transceiver is configured for utilizing one of a plurality of threshold values for selecting the future resources, the plurality of threshold values associated with different priority classes. This allows to implement Quality of Service (QoS) in the transmission and in particular to have a higher degree of differentiation when compared to simply distinguish between usable and non-usable.

According to an embodiment, a transceiver configured for communicating in a wireless communication network being operated so as to schedule communication in a communication channel being organized in a plurality of resources arranged in a time-frequency grid. The transceiver is configured for performing long-term sensing for estimating a usability of resources of the channel for an own transmission; and for determining a plurality of future resources to be suitable for the own transmission and for ranking the plurality of future resources based on a measure related to a signal quality estimated for the future resources; and for selecting a subset of future resources from the plurality of future resources based on the ranking.

Further embodiments relate to a wireless network, to methods for operating the described transceivers and to a computer-readable digital storage medium.

BRIEF DESCRIPTION OF THE DRAWINGS

Embodiments of the present invention will be detailed subsequently referring to the appended drawings, in which:

FIG. 3b a schematic diagram illustrating a first option of aperiodic transmission according to an embodiment based on the evaluation according to FIG. 3a;

DETAILED DESCRIPTION OF THE INVENTION

Figure 1:
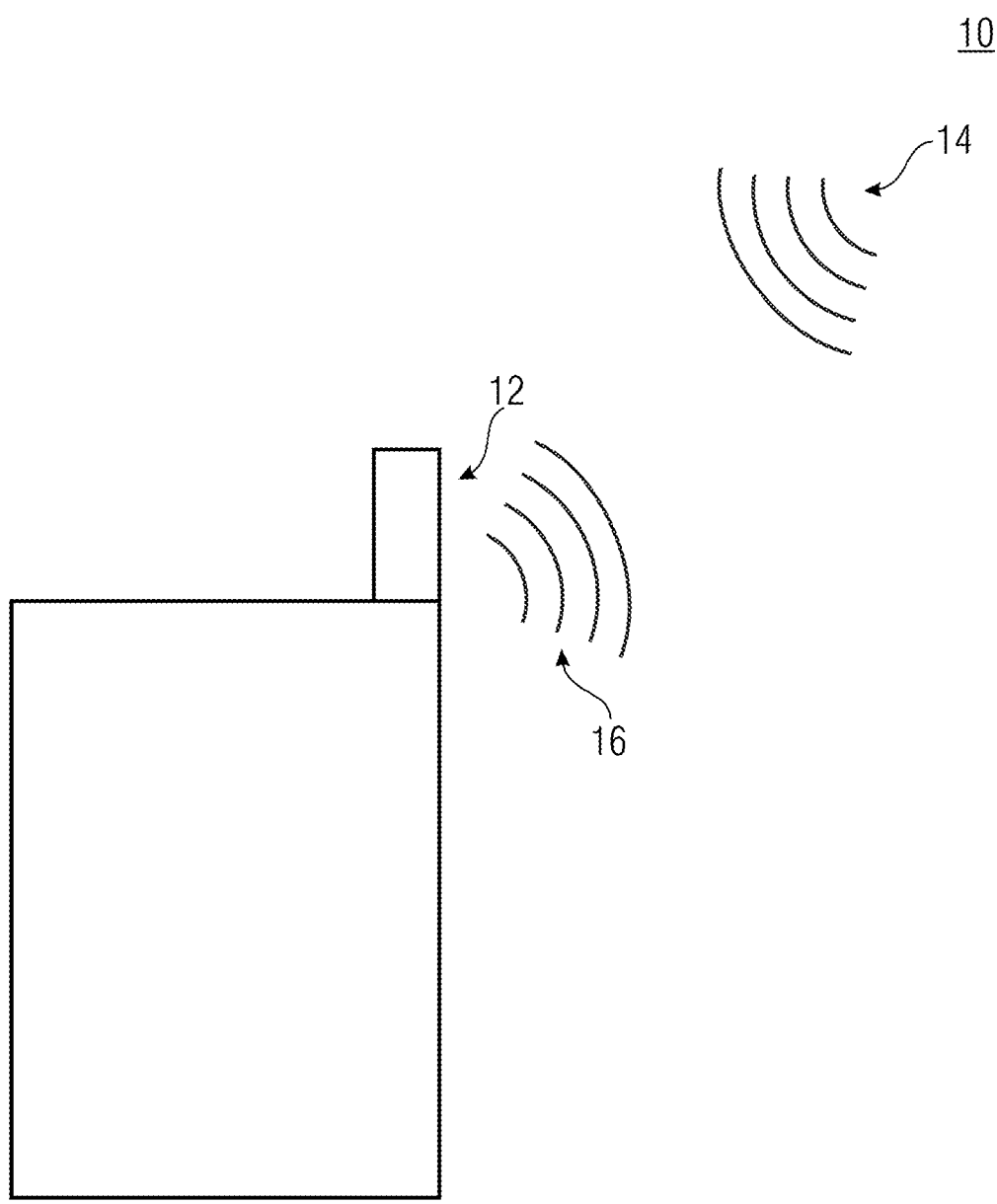
FIG. 1 shows a schematic block diagram of a transceiver according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described in the following, relate to wireless transmission of signals while making use of resources that are arranged in a time-frequency grid. A granularity of such a time-frequency grid may be understood as grouping resource elements into groups thereof, i.e., resource blocks (RBs), wherein a set or subset of resource blocks, i.e., one or more, may span a sub-channel in frequency which may be grouped to a set of sub-channels. A resource element may be a subcarrier in a single OFDM symbol that may be used for transmitting one or more symbols. Spatial multiplexing as in multiple input multiple output (MIMO) or multiple input single output (MISO) systems, which is also referred to as mapping to the spatial domain, may also be applied. Furthermore, transmissions can be pre-coded and thus beam-formed into certain spatial directions. A resource may be interpreted as the smallest possible allocation within the network. It may thus also happen that one transmission spans over multiple resources.

Although embodiments relate to transmission time intervals (TTI), the embodiments are not limited hereto. A TTI may also be understood as a time slot of communication such that those descriptions may be exchanged with each other without limitation. A transmission time interval is often abbreviated with TTI, and one TTI duration corresponds to a number of consecutive symbols for one transmission in time domain [TS38.804 5.4.7]. The combination of one numerology $\mu$, e.g. $\mu \in \{0, 1, 2, 3, 4\}$ with a subcarrier spacing (SCS) of $2^{\mu} \cdot 15$ kHz, and one TTI duration determines the exact length of the transmission on the physical layer. Note that a frame or radioframe in NR typically consists of 10 subframes of 1 ms each. Each subframe is divided into slots, each with carrying 14 symbols, e.g. OFDM symbols or SC-FDMA symbols. The number of slots in a subframe depend on the numerology $\mu$. Note that subcarrier and sub-carrier are used as synonyms.

In general, a wireless communication system referred to in any of the embodiments may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with any LTE standard (LTE, LTE-A, LTE-A Pro, LTE evo) or the 5G or NR, New Radio, standard.

Some embodiments described herein may relate to a subchannel of a communication network or communication channel. As an alternative to a subchannel any other frequency resource may be used or employed according to the present embodiments, e.g., a specific frequency band or pattern.

Embodiments described herein may relate to transceivers and may in particular be explained in connection with user equipment (UE). Embodiments are not limited to UE but relate, without limitation to other types of transmitters or transceivers, e.g., a transceiver comprising at least one of
a user equipment;
a mobile or immobile base station,
a mobile terminal,
a stationary terminal,
a cellular IoT-UE,
a vehicular UE,
a group leader UE (GL),
an IoT or narrowband IoT, NB-IoT, device,
a ground based vehicle,
an aerial vehicle,
a drone,
a moving base station,
a road side unit (RSU),
a building, and
any other item or device provided with network connectivity enabling the item/device to communicate using the wireless communication network, e.g., a sensor or actuator.

For example, a mobile or immobile base station, may comprise one or more of
a macro cell base station,
a small cell base station,
a central unit of a base station,
a distributed unit of a base station,
a road side unit,
a UE,
a group leader (GL),
a relay,
a remote radio head,
an AMF,
an SMF,
a core network entity,
a mobile edge computing entity,
a network slice as in the NR or 5G core context, and
any transmission/reception point, TRP, enabling an item or a device to communicate using the wireless communication network, the item or device being provided with network connectivity to communicate using the wireless communication network.

FIG. 1 shows a schematic block diagram of a transceiver 10 according to an embodiment. The transceiver 10 may be configured for communicating in a wireless communication network, for example by using an antenna arrangement 12 having one or more antennas. The transceiver 10 may be configured for scheduling communication in a communication channel being organized in a plurality of transmission time intervals. In each transmission time interval a plurality of frequency ranges or sub-channels may be available, providing for a frequency dimension in addition to a time dimension that is spanned by the TTIs. Resources are thus available in a time-frequency grid, wherein a granularity is optionally but not necessarily selected to a use of a complete TTI over one or more complete sub-channels. Other implementations are supported without any limitation. Although relating to subchannels in the following, the embodiments described herein may relate to a different granularity of the frequency domain. The term resource used herein may relate to any amount of frequency bandwidth, e.g., subchannels, for a certain amount of OFDM symbols or time.

Some embodiments allow for exploiting a spatial domain in addition to the time-frequency grid. Some embodiments are configured for performing beamforming using static and/or varying beams so as to have different signals transmitted to and/or received from different location or areas with respect to the transceiver.

The transceiver 10 may be configured for determining an utilization of a channel by decoding a control information. That is, the transceiver 10 may receive a wireless signal 14 that is obtained by receiving information or data being transmitted by other transceivers. The utilization may indicate at least one of an identification or an ID of a transceiver using the resource, a sub-channel used by the transceiver using the resource, a transmission time interval used by the transceiver. The transceiver 10 may obtain utilization information that indicates the utilization.

Transmissions of the other transceivers may superimpose in the wireless signal 14. By performing long-term sensing, the transceiver may monitor the wireless signal 14 whilst considering the communication scheme that is implemented in the wireless network. The transceiver 10 may decode the control information of the wireless signal 14. Alternatively or in addition, the transceiver 10 may perform a power sensing, also designated as long-term sensing, that is monitor a power transmitted by other transceivers using the respective resource, e.g., a subchannel of a TTI. Whilst decoding of control data may allow to obtain duration information about a (remaining) duration and/or future and past periodicity of transmissions contained in the wireless signal 14, also a power sensing may as well as decoding allow for obtaining a past repetition pattern, e.g. periodicity and offset, which allows for forecasts or estimates of channel occupancy. The transceiver may be configured for obtaining, from the decoding and/or from the power sensing, a repetition information indicating a repetition pattern of the data traffic; wherein the transceiver is configured for estimating the usability of the resources based on the repetition information. That is, a duration information and/or a repetition information may be determined and used.

The transceiver 10 may thus be configured for estimating a usability of resources of the channel for an own transmission based on the decoding and/or power sensing. That is, the transceiver 10 may be configured for transmitting a wireless signal 16 using the antenna arrangement 12 using resources of the wireless network. The transceiver 10 may organize its own transmission 16 so as to comply with the wireless signal 14. For example, the transceiver 10 may forecast or predict one or more resources, sub-channels in one or more future transmission time intervals or time slots of the channel so as to be unused in the future or at least partially or sufficiently usable. One or more of such estimated resources may be selected by the transmitter 10 for the wireless signal 16 such that the transceiver 10 schedules the own transmission 16 based on the usability of resources.

The transceiver 10 may be configured for obtaining, from the decoding, the duration information indicating a remaining duration of the data traffic contained in the wireless signal 14. The transceiver 10 may be configured for estimating the usability of the resources based on the duration information.

The selection may optionally be coupled to a spatial domain, i.e., one or more spatial layers of the transceiver may be selected for transmission.

Figure 2:
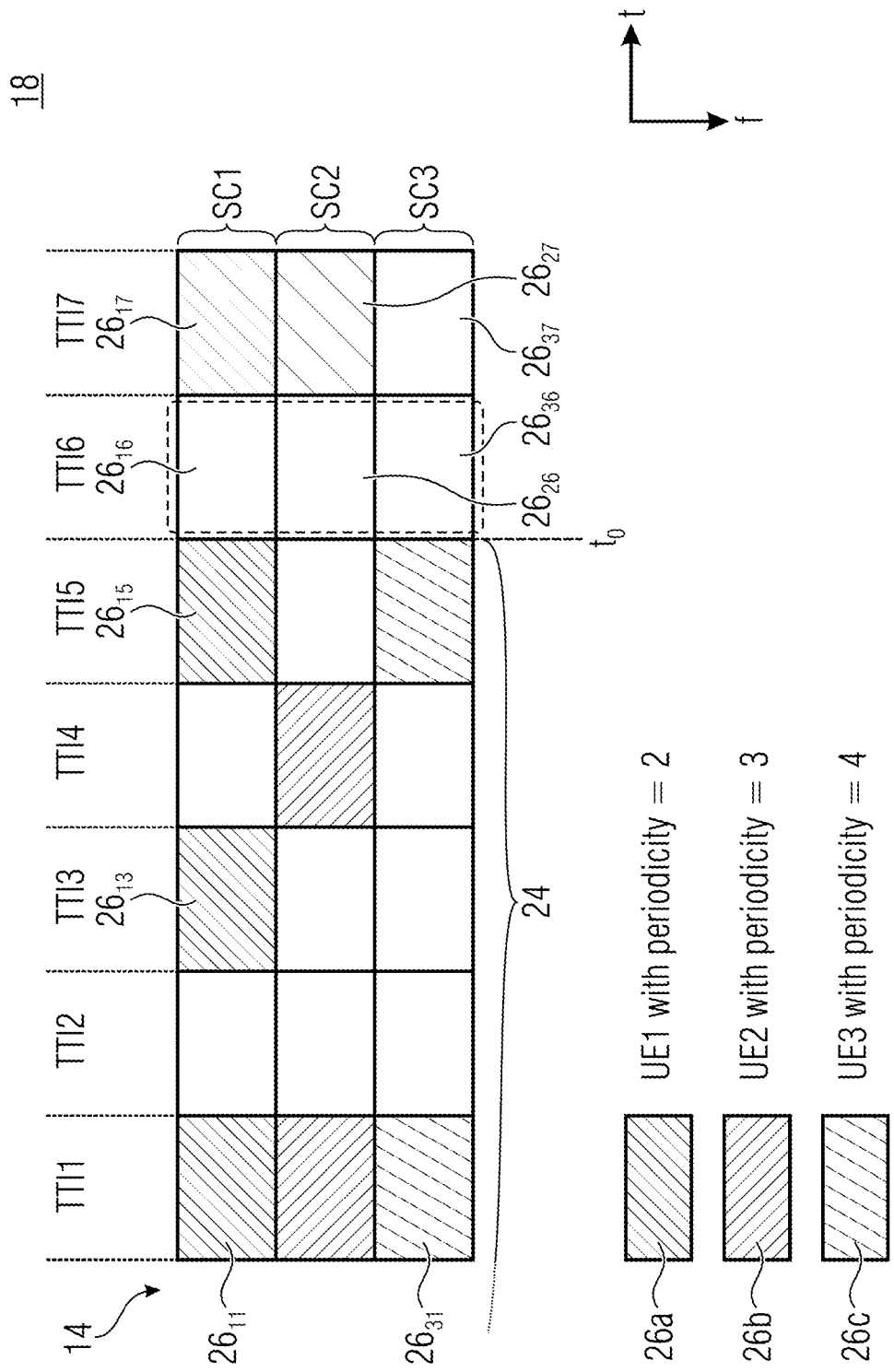
FIG. 2 shows a schematic diagram representing a wireless signal being monitored and evaluated by a transceiver according to an embodiment in view of a long-term sensing.

FIG. 2 shows a schematic diagram representing the wireless signal 14 being monitored and evaluated, for example, by the transceiver 10. A channel 18 of the wireless communication network may provide for a number of sub-channels SC1, SC2, SC3, . . . , wherein the number of sub-channels may be at least 1, at least 2, at least 3, at least 5, at least 10 or even more and is selected to 3 for illustrative reasons only. By way of example, different transceivers that access channel 18 transmit communication signals 22a, 22b and 22c on the channel 18. For example, a first transmitter emits communication 22a, a second transmitter emits transmission/communication 22b and a third transmitter transmits communication 22c. It is noted that transmitters may be active on the channel that transmits more than one communication 22a, 22b or 22c or less. Although being illustrated as having one sub-channel SC1, SC2 or SC3 per transmitter (UE), other transmitters may also transmit their traffic in more than one and/or separated sub-channels, e.g., by performing frequency hopping.

Anyhow, such scheme may be transmitted in control data of the respective communication 22a, 22b and 22c such that the illustration of FIG. 2 is not limited to its content.

By way of example, a first transmitter transmits data with a periodicity of 2, i.e., each second transmission time interval (TTI) in SC1. For example, communication 22a is organized that way.

A different communication on the channel 18 is transmitted with a periodicity of, for example, 3, i.e., each third TTI is occupied by communication 22b.

A further communication 22c is transmitted with a periodicity of 4, i.e., the sub-channel SC3 is occupied in each fourth TTI by the transmitter (UE3) transmitting communication 22c.

Transceiver 10 may monitor and/or evaluate channel 18 by monitoring the wireless signal 14, for example, for a duration of a sensing window 24 to determine its further actions. For example at current/present time to and by way of example, TTI1 to TTI5 are past TTIs in the given order, whilst TTI6 is a first next, future TTI and TTI7 is a subsequent, adjacent future TTI. By decoding the wireless signal 14 and the communications 22a, 22b and 22c, it has knowledge about the further transmissions of UE1, UE2 and UE3 transmitting the communication 22a, 22b and 22c. It may estimate, based thereon, i.e. based on the utilization, a number of sub-channels available in a future transmission time interval, e.g., in TTI6 and TTI7, and for selecting, from the estimated number, one or more time slots for transmission of the wireless signal 16.

The different number of sub-channels occupied in future transmission time intervals TTI6 and TTI7 may be associated with an amount of data to be transmitted and/or to a quality of the channel during that TTI. According to embodiments, the transceiver may have instructions to transmit more than one different data streams. The transceiver 10 may be configured for selecting, from the estimated number of available resources a priority (e.g. according to a Quality of Service that may be used) of data to be transmitted using the future time interval. For example, by having knowledge about three unused sub-channels in TTI6, the transceiver 10 may select data to be transmitted having a requirement for a high priority or QoS. Alternatively or in addition, transceiver 10 may transmit a signal having a low priority or requirement for a low QoS in TTI7 having only a number of one free sub-channel. Alternatively or in addition to selecting a data stream so as to correspond to the future transmission time interval, the transceiver 10 may be configured for selecting a future resource, i.e., one or more frequency resources in one or more future transmission time intervals from a plurality of future resources based on the estimated number for transmitting the data with a priority. That is, the transceiver 10 being requested to transmit data having a high priority may select TTI6 as having a high number of free resources or free sub-channels. In contrast, the transceiver 10 being requested to transmit data that have a low priority may select TTI6 or TTI7, as both fit the requirement of the transmission. Advantageously, the transceiver 10 selects TTI7 for its transmission, as this TTI has sufficient quality and additionally allows to leave TTI6 unused for other transceivers that possibly have to transmit data with a higher priority.

That is, the transceiver 10 may be configured for selecting the future resources for transmission from the plurality of available future resources based on an estimated number of available resources, wherein the transceiver is configured for associating the priority of its own transmission with a minimum number of available resources to be used. The transceiver may select the future resources based on the minimum number.

The transceiver may be configured for utilizing one of a plurality of threshold values for selecting the future resources for transmission. The plurality of threshold values may be associated with different resource priority classes and different priority classes of data traffic in the network, where the lowest resource priority means occupied and hence, is not associated to any data priority class. That is, the transceiver may, for example, be configured for obtaining the plurality of threshold values as a plurality of pre-defined threshold values or by a stepwise increase of a single threshold value. The plurality of pre-defined threshold values may be pre-defined, i.e. static or pseudo-static in the network, pre-configured, i.e. determined by a manufacturer, and/or may dynamically be signaled within the network, e.g. by using RRC (Radio Resource Control) and/or DCI (Downlink Control Information) and/or SI (System Information) signaling. In other words, embodiments relate to two different aspects of the sensing procedure. The sensing procedure itself, followed by the selection of resources based on the sensing procedure. In the sensing procedure, efficient procedures may be implemented for periodic transmissions as well as for aperiodic transmissions. For periodic transmissions, embodiments propose that the UE determined the repetition information of other UEs' periodic transmissions while carrying out a long-term power sensing procedure and/or a procedure involving the decoding of control information of other transceivers. The transceiver (UE) may use this information for the selection of resources. For aperiodic transmissions, embodiments propose that while the UE uses a combination of long-term, decoding and short-term sensing, it determines whether it can extend its transmission to the following time slot or not.

By way of non-limiting example, the transceiver 10 may comprise one transceiver branch or more transceiver branches operative in parallel. Each transceiver branch may differ from others by way of a frequency range and/or a spatial domain. That is, the transceiver may be configured for using the first transceiver branch and the second transceiver branch for different frequencies; and/or for different spatial areas with respect to the transceiver. The transceiver 10 may be configured for performing short-term sensing and/or long-term sensing on a first receiver branch using a first automatic gain control (AGC), and for performing the long-term sensing and/or the short-term sensing on a second receiver branch using a second automatic gain control (AGC), with different AGC configurations. That is, the transceiver may use different AGCs so as to increase overall space covered by the AGCs.

Whilst long-term power sensing and/or decoding may allow for estimating the future based on the past, therefore for determining a probability of an availability or a probability of usability, the short-term sensing according to embodiments may be related to a availability of the present actual resource as it measures if this resource is actually used or available.

In the selection procedure, embodiments propose that the UE categorizes the resources into different sets based on the sensing it had carried out. For example, in a time slot with five sub-channels, a UE carries out sensing and if it detects all the five sub-channels to be completely unoccupied by other UEs, the UE can classify the time slot as resources that can be used for high QoS packets. If the UE detects that two of the sub-channels are occupied, but three are available, the resources can be classified to be used for medium QoS packets. If only one of the five sub-channels is available, the resources can be classified to be used for low QoS packets. The values of in total available sub-channels as well as the number of determined available sub-channels that may be used as thresholds, may have any suitable value.

The mentioned categorization or classification of sensed resources can be carried out in two possible ways:
  categorization based on multiple pre-defined thresholds; or
  categorization based on step-based increase of single pre-defined thresholds.

As shown in connection with FIG. 2, the transceiver may be configured for using the utilization information indicating the utilization for scheduling the own transmission as periodic transmission. The utilization information may be transceiver-specific, i.e., it may be obtained individually for the transceivers. As periodic transmission a planned transmission that repeatedly may use resources may be understood.

When a UE is carrying out sensing and measurement of the received signal strength on different UEs, e.g., by evaluating a received signal receive power, it may also decode the control information being transmitted in these resources. In the case of a periodic transmission by other UEs, the control information may also include the periodic intervals in which the UEs would transmit, along with the overall duration of these transmissions. This information is evaluated and used according to embodiments.

That is, resources $26_{ij}$ with i indicating a sub-channel of channel 18 and j indicating a TTI implemented, may be used by other transceivers. By evaluating the traffic, via a signal 14, the UE may have knowledge that resources $26_{11}$, $26_{13}$ and $26_{15}$ are used by UE1, i.e., communication 22a and may therefore predict or determine or estimate that the same transmission may occupy resource $26_{17}$ in the future. Based on the periodicity of communication 22b, transceiver 10 may also estimate a use of resources $26_{27}$ by communication 22b whilst it may determine sub-channel 3 as being free in TTI7, i.e., resources $26_{37}$ may be unused. I.e., the transceiver 10 may predict that resources $26_{16}$, $26_{26}$ and $26_{36}$ are available. Transceiver 10 may further predict that resources $26_{17}$ and $26_{27}$ are used by UE1 and UE2.

Embodiments propose that the TX (transmitting) UE that is carrying out the sensing procedure also takes into account the decoded control information when it shortlists the resources it could select for its own transmissions. The TX UE can then successfully predict whether other UEs would be occupying resources, what pattern these UEs would be using the resources, and for how long. This is shown in FIG. 2, where the TX UE is able to predict the periodic transmission of other UEs successfully based on the information in the control information plus the measurement of the received power at the resources.

In connection with aperiodic transmissions, a transceiver according to an embodiment, for example, the transceiver 10, alternatively a different transceiver, may be configured for scheduling an aperiodic transmission in a future resource based on the usability of the resources and for performing a short-term sensing in the future transmission time interval.

As short-term sensing, one can understand a measurement of power on channel 18 after a start of a TTI/time slot and for deciding, for the same TTI/time slot, to transmit.

The transceiver may be configured to transmit in adjacent TTIs, e.g. TTI6 and TTI7, when the sub-channels of the TTI are predicted to be available, while performing the short-term sensing only in the first time slot, e.g. TTI6. The receiver may determine that an amount, e.g., a duration or bandwidth, of the own transmission exceeds the current resource, e.g., transmission time interval or bandwidth, e.g., TTI6, and for selecting the resource of transmission time interval such that an adjacent future resource of a transmission time interval, e.g., TTI7 in sub-channel 3, is additionally estimated to be available. The transceiver may be configured for using the resources of transmission time intervals TTI6 and TTI7 for the own transmission.

Figure 3A:
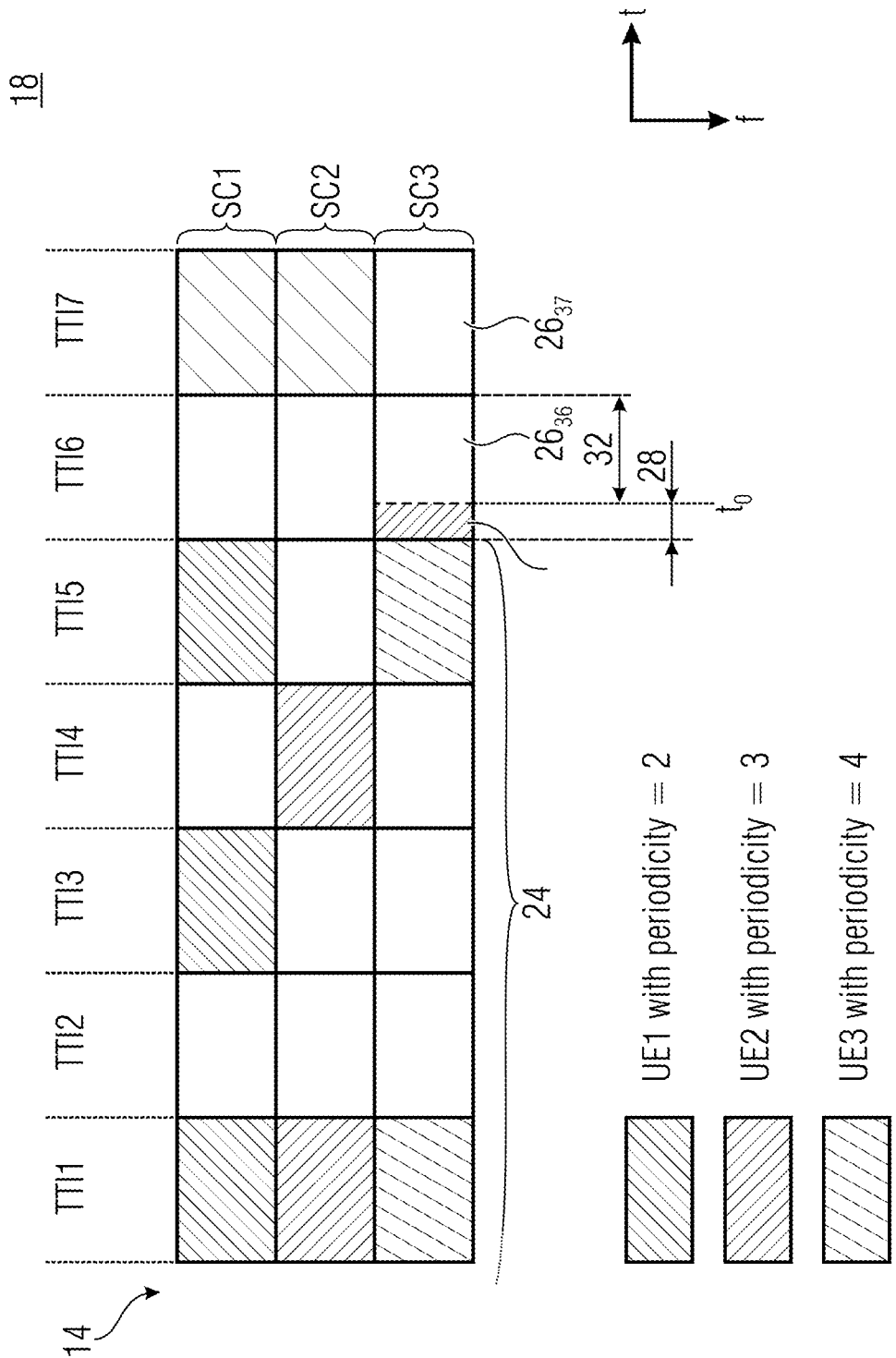
FIG. 3a shows a schematic representation of an evaluation of the wireless signal according to an embodiment in view of a short-term sensing.

This is shown in FIG. 3a showing the same scenario as in FIG. 2, wherein a current point in time to is within TTI6, i.e. some time of TTI6 has already elapsed and the transceiver 10 determines that TTI6 may be used for spontaneous transmission. The elapsed time 28 leads to the effect that the remaining time 32 may be, at least in view of the aimed quality, insufficient for transmitting all of the data that may be used. As having knowledge or at least expectation that the resource $26_{37}$ is also unused in the future, the transceiver 10 may select resources $26_{36}$ and the adjacent resources $26_{37}$ for the transmission. This may lead to the effect that at the beginning of resources $26_{37}$, the transceiver 10 is transmitting, therefore avoiding disturbing spontaneous transmissions of other UEs that listen to the channel. The transceiver 10 therefore mixes information obtained through short-term sensing, i.e., TTI6 has resources in SC3 and of long-term sensing and/or decoding, i.e., that resources $26_{37}$ are expected to be free in SC3.

That is, when a TX UE intends to carry out an aperiodic transmission, the UE is expected to carry out long-term sensing and/or decoding of control information anyway for the previous resources across the pre-defined sensing window. This is because a TX UE can carry out either periodic or aperiodic transmissions. In order to conclusively decide that a resource is indeed available, the UE also carries out short-term sensing in the resources it intends to transmit. The drawback of short-term sensing is that a few symbols of the time slot in which the UE intends to transmit in cannot be utilized for transmission, since it will be listening to check whether any other UE is transmitting in the said resource. In this case, the TX UE might need more resources, i.e., resources in the next time slot as well, for completing its intended transmission. Here, embodiments propose that the UE uses the long-term sensing information to determine whether the adjacent resource is also available for the UE to use for its transmission as shown in FIG. 3a.

Figure 3B:
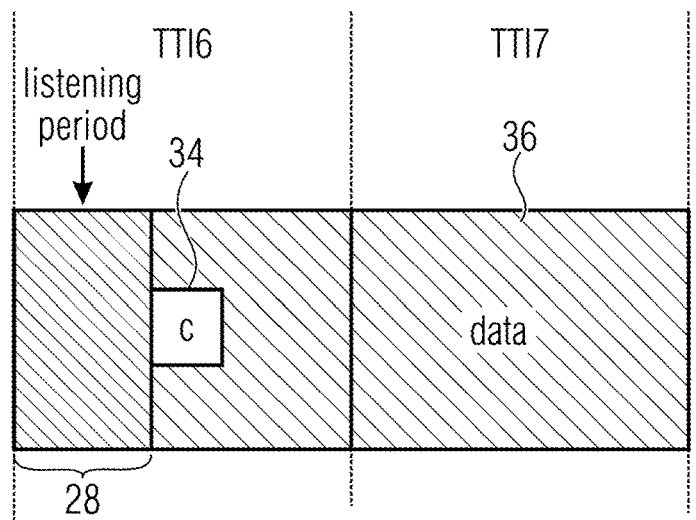
Figure 3C:
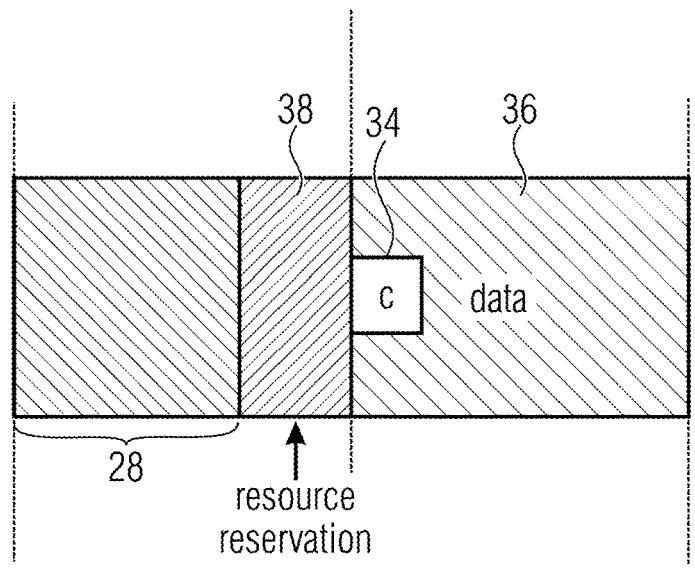
FIG. 3c a schematic diagram illustrating a second option of aperiodic transmission according to an embodiment based on the evaluation according to FIG. 3a, using a reservation information.
Figure 3D:
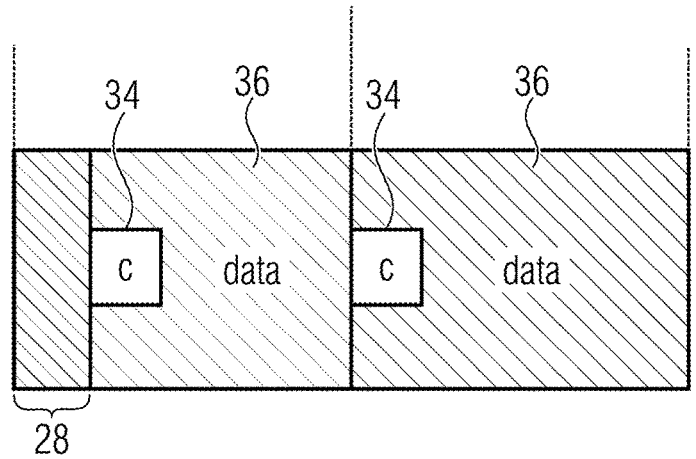
FIG. 3d a schematic diagram illustrating a third option of aperiodic transmission according to an embodiment based on the evaluation according to FIG. 3a according to which control data is transmitted in two transmission time intervals.

The UE may use two criteria for the selection of resources:
- if the resource in TTI6 is available using short-term sensing and long-term sensing and/or decoding of control information;
- if the resources in TTI7 is available using long-term sensing and/or decoding of control information Possibilities of how the TX UE utilizes the selected resources illustrated in FIG. 2a based on the duration of the listening period are shown in FIGS. 3b, 3c and 3d.

The transceiver may be configured for performing the short-term sensing prior to a transmission and during the listening period 28 leading to the elapsed time. The transceiver may be configured for scheduling the own transmission so as to transmit control data 34 directly or immediately after the listening period 28 followed by payload data 36 that may, optionally, be transmitted using frequencies unused by the control data 34 as shown in FIG. 3b. FIG. 3c shows an option in which the transceiver may be configured for scheduling the own transmission in a subsequent TTI. For example, the control data 34 may be transmitted at a beginning of TTI7. In TTI6 the transceiver may transmit a reservation information or a resource reservation 38 instead of transmitting data so as to reserve for the resources in TTI7.

A further option which is shown in FIG. 3d shows a transceiver that is configured for scheduling the own transmission so as to transmit control data 34 and payload data 36. The control data 34 may be transmitted within the TTI6 and the TTI7 which are used for a same transmission. Control data in TTI6 and TTI7 may be a copy of one another (possibly amended in view of the time that has elapsed) or may be a part of a same, combined information.

In other words, according to a first option, it is possible for the TX UE to transmit the control and data immediately after the conclusion of the listening period, where the data will span time slot 0 (TTI6) as well as time slot 1 (TTI7) as shown in FIG. 3b. According to a second option, in the case where the listening period is longer, and there are not many symbols left in time, slot 0 (TTI6) for the transmission of the control and data, the UE can choose to send a resource reservation message 38 to other UEs in the remaining symbols of time slot 0. This may ensure that no other UE would use the resources in time slot 1 as shown in FIG. 3c. According to a third option, in the case where the listening period was very short, thereby leaving enough symbols for the UE to transmit control as well as data in time slot 0 (TTI6), it can repeat the control information 34 in time slot 1 as well, in the case where the receiving UEs had missed the control information transmitted in time slot 0. This is shown in FIG. 3d.

Alternatively or in addition to decode the control information on the channel and/or to estimate subsequent future time intervals (including the current one) for an aperiodic transmission, a transceiver according to an embodiment, e.g., transceiver 10, may be configured for obtaining a plurality of thresholds used for a prioritization from a list of thresholds having a plurality of indices associated with different values of the thresholds. For example, the transceiver may be configured for obtaining the plurality of threshold values based on a formula or criterion that is based on at least one of a calculation and/or a configuration and/or a measurements. Examples relate to obtaining the plurality of threshold values based on a plurality of predefined threshold values or by a stepwise variation of a single threshold value. The step size may be a constant step size but may also vary, e.g., logarithmically for example, so as to comprise a high step-size at low quality values and smaller step sizes at high quality values or vice versa. Alternatively, the step size may vary linearly or non-linearly according to any suitable rule.

The term priority in connection with embodiments described herein may relate to different types of priority. For example, the priority may be a priority associated with a service parameter such as Quality of Service (QoS), which is sometimes referred to herein as quality priority. For example, a priority may also relate to a categorization of a resource which is sometimes referred to herein as resource priority. The resource priority may, for example, relate to classes of channel quality, e.g., worst, best and one ore in between, e.g., at least three resource priorities. A worst class may be regarded as unusable or too bad such that three resource priorities may support two quality priorities to be transmitted. In other words, the data to be transmitted may be classified into priority classes, based on the one or some of its corresponding Quality of Service (QoS) requirements: These parameters or metrics are, e.g. priority, bit rate, tolerable delay, or minimum communication range. As both terms are directed to the same idea of requiring some kind of quality for a specific reliability of transmission, the terms are exchangeable herein.

The resources are classified into priority classes, and each priority class of resources is to provide a certain quality of service (QoS) profile or one or some Quality of Service (QoS) metrics or parameters.

These requirements can also be given as an abstract class e.g. VQI, 5QI, or PQI.

Quality of Service metrics and/or parameters includes one or more:
Priority,
Reliability,
Bit rate,
Minimum communication range,
Traffic pattern, e.g., burst bit rate
Delay.

Alternatively or in addition, the transceiver may store a plurality of lists having a corresponding number of pluralities of threshold values and may be configured for using one of the plurality of lists during an instance of time. That is, the transceiver may implement different thresholds. For example, the transceiver may be configured for supporting at least three resource priority classes and for classifying a future resource with regard to the at least three priority classes based on the usability of resources as described in connection with FIG. 1. For example, the transceiver may be configured for associating a decreasing utilization of resources with a higher possibly priority class of data to be transmitted using a future resource. The at least three resource priority classes may be used for transmitting at least two (e.g., by omitting the worst quality) data priority classes and for classifying a future resource with regard to the at least two data priority classes based on the usability of resources.

That is, for the UE to be able to categorize the resources it senses into different QoS levels, embodiments propose to introduce multiple thresholds corresponding to the different QoS levels. For example, the number of QoS levels may be set to 3 (or any other suitable number), e.g., corresponding to "high", "medium" and "low". Based on these QoS levels, there could also be defined three thresholds for the receiving signal strength that the UE measures in the resources. If the UE carries out sensing on resources by measuring the detected received signal strength and it falls below the threshold set for high QoS, the resource can be classified as one that can be used for high QoS transmissions. If the measured signal strength is higher than the threshold for a high QoS, but below the one for the medium QoS, the resource can be classified as one that can be used for medium QoS transmissions. The same mechanism may be used to determine resources for low QoS transmissions.

In this case, the thresholds can be pre-defined, pre-configured or dynamically signaled. Such a signaling may be used for one, more or even all transceivers, based on a requirement or special properties or importance of transceivers, e.g., emergency devices. For example, a downlink control information (DCI), a Radio Resource Control information (RRC) or a System Information (SI) may be used to instruct a respective transceiver or groups thereof. This can be done as part of the QoS set-up or separately as a part of the sensing configuration, within the SL-CommTxPoolSensingConfig information element, provided in the SIB (system information block) itself. In LTE Rel. 15, the threshold for the received power measured on the resources was provided in the UE via RRC signaling (RRC=radio resource control), using the parameter SL-ThresPSSCH-RSRP which is selected from a list defined in the SL-ThresPSSCH-RSRP-List information element. In the concept described above, embodiments propose that instead of selecting a single threshold, multiple thresholds can be provided to the UE, based on which resources can be selected according to the corresponding QoS requirements. This can be done, for example, in two possible methods:

method 1: the same list of thresholds is maintained, but multiple indices are selected corresponding to the QoS requirements;

method 2: multiple lists of thresholds are maintained, with each list corresponding to different values of thresholds for each of the different QoS levels.

A dynamic signaling may be performed, e.g., by the network which may be a eNB in LTE/LTE-A/LTE-A Pro/LTE evo or a gNB in NR, or any network entity from the EPC or network function (NF) proved by the 5G core network (5GC).

Figure 4:
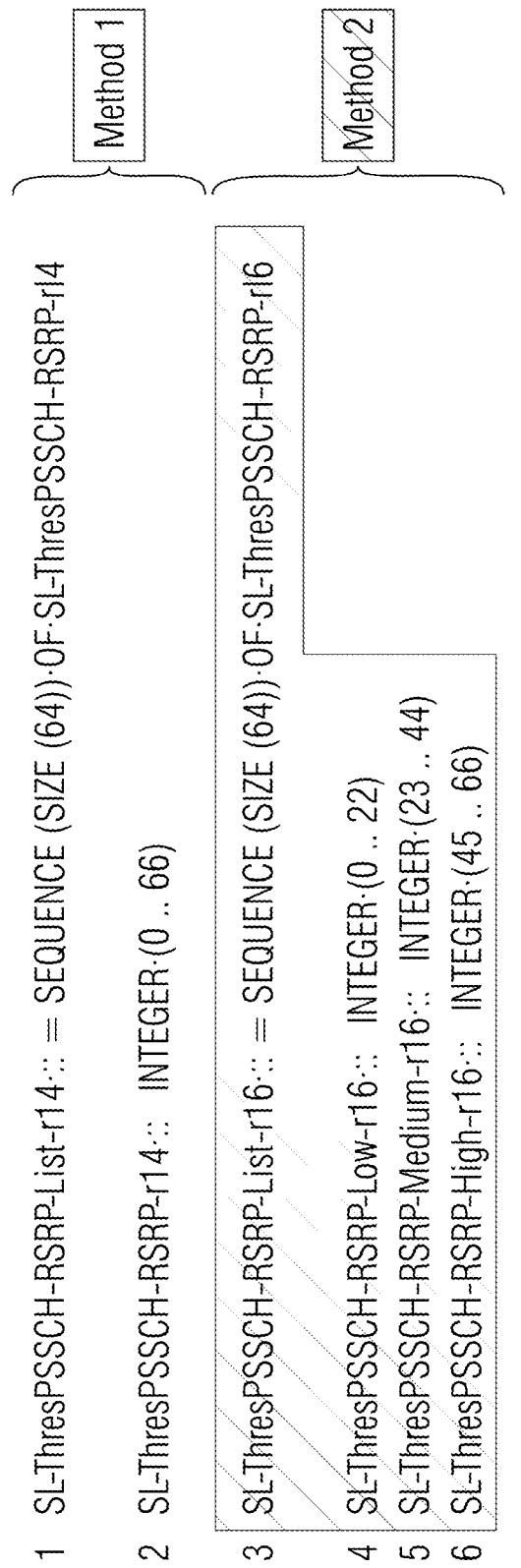
FIG. 4 shows an example pseudocode according to an embodiment.

A sample information element structure is shown in FIG. 4 showing an example pseudocode. It is to be noted that the syntax of the pseudocode is not limiting in view of the embodiment. It is just selected for explanatory reasons and indicates that methods 1 and 2 described above may be implemented independently. Whilst code lines 1 and 2 are directed to method 1, code lines 3, 4, 5 and 6 are related to method 2 and show that three different threshold levels may be selected for different QoS classes of the transmission, e.g., an integer value (value range of the threshold) between 0 and 22 for low QoS, between 23 and 44 for medium QoS and 45 to 66 for high class QoS, wherein it is to be noted that an amount of threshold values and a segmentation and a size of a total value range may be adapted according to present needs. A SL-ThresPSSCH-RSRP-List field may be described as a value of 0 corresponds to $-\infty$ (infinity) dBm, value 1 corresponds to $-128$ dBm, value 2 corresponds to $-126$ dBm, value n corresponds to $(-128+(n-1)*2)$ dBm and so on, value 66 corresponds to $+\infty$ (infinity) dBm.

Alternatively or in addition to having a plurality of thresholds, to decoding the control information and to combining short-term sensing and long-term sensing, a transceiver in accordance with embodiments, e.g., transceiver 10, may be configured for performing long-term sensing and decoding of control information for estimating a usability of resources of the channel for an own transmission, e.g., by observing the power transmitted therein or by, optionally, decoding the control information of other transceivers (optionally in combination with observing of the power as described). The transceiver may be configured for determining a plurality of future resources to be suitable for the own transmission and for ranking the plurality of future resources based on a measure related to a signal quality estimated for the future transmission time intervals. The transceiver may be configured for selecting a future resource, i.e., a transmission time interval and/or one or more sub-channels from the plurality of future resources based on the ranking. The short term sensing may be performed on a subset of resources based on the long-term sensing result, i.e., the long-term sensing may provide for an indicator of free resources and the short-term sensing may be use to prove this expectation.

Ranking may be performed in the time domain and/or in the frequency domain. I.e., the transceiver may be configured for ranking a number of subchannels or other frequency resources within one time interval and/or for ranking a plurality of time intervals or for ranking combinatory resources in the time frequency grid according to "Should the transmission happen in TTI1, TTI2, TTI3, TTI4, TTI5, . . . ?" and/or "should the transmission happen on frequency (resource) a, b, c, d, e, . . . ?" and/or "should the transmission happen in time and frequency on resource 1a, 1b, . . . 2a, 2b, . . . 5a, 5b, . . . 5d, 5e, . . . ?".

For example, the transceiver may be configured for transmitting one of a plurality of priority classes. The future resource may be selected from the plurality of future resources based on an estimated channel quality of the future resource. For example, the estimated channel quality may be associated with a power in the channel and/or a number of used resources. For example, when referring again to FIG. 2, the channel may have a higher expected quality in TTI6 when compared to TTI7. The transceiver may be configured for selecting the future resource so as to have a channel quality based on the priority class. The transceiver may start from a threshold value associated with the channel quality to determine that no suitable future resource is available and to increase the threshold value until a suitable future resource is available. For example, the channel in FIG. 2 expected in TTI7 is classified as being suitable for low QoS transmission, whilst the channel in TTI6 is expected to be good enough to allow high QoS transmissions as all sub-channels are expected to be free. The transceiver 10 having a medium QoS transmission to transmit may apply a threshold value corresponding to a medium level, see, for example, code line 5 in FIG. 4. It will then increase the integer value or threshold value until a suitable future resource, i.e., TTI6, is found. It is noted again that FIG. 2 is for illustrative reasons only. A plurality of future TTIs and sub-channels may be selected such that a plurality of threshold values is implemented. The transceiver may be configured for using a future resource having a channel quality better than the associated priority class only if no future resource with the associated priority class is available.

In general terms, a transceiver described herein may be configured for adapting one or more threshold values associated with the selection of resources. The threshold range of a priority class of data and/or of channel quality may comprise an upper (including infinity) and a lower limit (including zero or negative infinity). Considering the situation of the transceiver, an increase in search space based on an insufficient amount of resources available for the own transmission may be enlarged by decreasing (possibly with exception for the lowest class), for example, a lower threshold of allowed channel quality such that the transceiver uses also a worse channel quality. Alternatively or in addition, the upper threshold may be increased (possibly with exception for the highest class) therefore allowing the transceiver to access resources that are intended for a higher priority of the data. Both may be referred to as a variation of thresholds. Increasing an allowed resource quality (goodness) of resources to be accessed, may be equal or equivalent with decreasing a threshold for error badness and vice versa, such that embodiments that relate to vary one or more thresholds may relate to both, increase and decrease of one or more threshold values and to a combination thereof.

This may be understood as the transceiver may be configured for determining that no future resource with the associated priority class (corresponding to the current threshold) is available. Based thereon, the transceiver may vary, i.e., increase or decrease, one or more threshold values for the own transmission such that a higher or lower level of channel quality falls within a search space respectively and to search for a future resource with the associated priority class being available using the increased threshold.

The transceiver may be configured for increasing the threshold by use of a step-size that is one of a pre-defined step-size, a pre-configured step-size and a dynamically signaled step-size. Using a multiple threshold values allows that the UE uses resources associated with the respect QoS class or priority class as far as possible so as to leave resources with a higher quality for transmissions that are in need of the high quality.

The transceiver may be configured for increasing the threshold by use of a step-size that is related to an absolute value of a channel quality measure, e.g., a power over all sub-channels, or to a number of resources additionally evaluated with the increased threshold. That is, an increase of the threshold may lead to a consideration of additional resources. For example, a power quality measure may rely on one or more of a SNR=Signal to noise ratio
SINR=Signal to interference plus noise ratio
RSSI=Receives signal strength indicator
RSRP=Reference signal received power
RSRQ=Reference signal received quality
CSI=Channel state information
CQI=Channel quality information
RI=rank indicator
CBR=Channel busy ratio
Resource occupancy map
Availability (Probability of future utilization)
Expected interference Those measures may be also taken for any other channel quality measure according to embodiments.

In other words, a categorization may be based on a step-based increase of single pre-defined thresholds. Embodiments propose that the threshold may be set so as to correspond to the high QoS level. Every time the UE carries out sensing of resources and cannot sense enough available resources, the UE may increase the threshold by a fixed number (e.g., a certain dB-value, e.g., 1 dB, 2 dB, 3 dB, 4 dB or more) to the medium QoS level. The resources sensed during the increased threshold may be classified to be used for medium QoS transmissions. Similarly, if the threshold has to be increased again by the same fixed number, the resources sensed can be classified to be used for a low QoS transmission. In this case, the step-size as well as which part of the rank resources are to be used can be pre-defined, pre-configured or dynamically signaled. This can be absolute values or can be adapted by the UE so that each step contains a certain amount of resources.

Alternatively or in addition to other embodiments, a transceiver may be configured for determining a plurality of future resources to be suitable for the own transmission and for ranking the plurality of future resources based on a measure related to signal quality estimated for the future resources. The transceiver may be configured for selecting a future resource from the plurality of future resources based on the ranking. That is, future resources that are available may be ranked or sorted.

The transceiver may be configured for selecting the future resource so as to comprise a worst channel quality that is above a threshold value associated with a priority class of own transmission. Alternatively or in addition, the transceiver may be configured to select the future resource so as to be one of a subset of future resources having a worst channel quality that is above a threshold value associated with a priority class of the own transmission; and for selecting one of the subsets based on a random selection or a weighted random selection within the evaluated subset. The transceiver may be configured for ranking the plurality of future resources based on at least one of an occupancy of the resources during a plurality of past transmission time intervals and/or measurements of a combined total energy accumulated on the resource corresponding to the future resource during a past measurement period and/or a probability of occupancy/utilization of the resource based on the evaluation of a plurality of past resources. The transceiver may be configured for ranking the plurality of future resources based on the measurement of the combined total energy accumulated on the resource and for applying weights to the measurement that decreases with an age of the measurement. For example, a moving average calculation or an exponential decaying may be implemented such that more recent measurements may have a higher impact on the calculated value when compared to more aged measurements. That is, older measurements may contribute less to the overall decision. This allows to use the worst channel quality that still matches the own requirements (or a random channel within a subset that has the lowest quality) so as to correspond to a methodology that may be expressed according to "take a quality that is sufficient" instead of "take the best available quality" such that better qualities are available for UEs having a higher requirement, that is, for supporting a high degree of fairness in the network.

Thresholds may be determined and/or varied in accordance with embodiments in time and/or frequency. I.e., at a same time different thresholds may be valid for different frequency resources or subchannels and/or over time, thresholds may vary.

In other words, alternatively to a categorization based on step-based increase of single pre-defined thresholds, or in addition hereto, the resources can be ranked (sorted) according to their perceived quality. Afterwards, a choice of resource may be done similarly as mentioned above. This procedure or algorithm can include the following steps:

- the sorting/ranking can be done by measuring the occupancy of the resource at several instances in the past;
- measuring the combined total energy accumulated on the resources during the measurement period;
- weighting the measurements according to the age of the measurements, e.g., decisions on more recent resources are ranked higher than "older" resources taken from the past.

The selection can then be done by doing random or weighted random choice over the whole or a subset of the resources. The weights or a subset may depend on the category of the data packet to be transmitted.

Embodiments allow to factor in QoS for the resources that are selected. With the advanced use cases and requirements provided in NR V2X, it may be of importance that the resources selected have to be mapped to the relevant QoS demands in order to meet the new requirements sufficiently. Embodiments address QoS requirements attached to the transmitted packets which are to be transmitted by a UE.

Embodiments described herein may be used in vehicular communication systems, e.g., V2X, as in the context of cellular (e.g. 3G, 4G, 5G, or future) or ad-hoc communication networks.

In the following, additional embodiments and aspects of the invention will be described which can be used individually or in combination with any of the features and functionalities and details described herein.

1. A transceiver configured for communicating in a wireless communication network being operated so as to schedule communication in a communication channel being organized in a plurality of resources arranged in a time-frequency grid;
    wherein the transceiver is configured for estimating a usability of resources of the channel for an own transmission based on performing long-term sensing an utilization of the channel by decoding a control data transmitted in the channel and/or by performing power sensing of the channel; and scheduling the own transmission based on the usability of the resources.

2. The transceiver of aspect 1, wherein the transceiver is configured for decoding the control data and for obtaining, from the decoding, a duration information indicating a remaining duration of the data traffic; wherein the transceiver is configured for estimating the usability of the resources based on the duration information; and/or
    wherein the transceiver is configured for obtaining, from the decoding and/or from the power sensing, a repetition information indicating a repetition pattern of the data traffic; wherein the transceiver is configured for estimating the usability of the resources based on the repetition information.

3. The transceiver of aspect 1 or 2, wherein the transceiver is configured for estimating, based on the utilization, an amount of resources available in a future time interval which is preferably one of a time slot and a transmission time interval, and for selecting, from the estimated amount, data to be transmitted that has a priority for which the estimated amount is suitable using the future resource; and/or
    for selecting a future resource from a plurality of future resources based on the estimated amount for transmitting the data with a priority; and/or
    for estimating the usability with regard to a spatial domain of the transceiver and for selecting a spatial domain according to the usability.

4. The transceiver of aspect 3, wherein the transceiver is configured for selecting the future resource from the plurality of future resources based on the estimated amount, wherein the transceiver is configured for associating the priority with a minimum amount of available resources to be used and for selecting the future resource based on the minimum amount.

5. The transceiver of aspect 3 or 4, wherein the transceiver is configured for utilizing one of a plurality of threshold values for selecting the future resource, the plurality of threshold values associated with different priority classes.

6. The transceiver of aspect 5, wherein the transceiver is configured for obtaining the plurality of threshold values based on a formula or criterion that is based on at least one of a calculation and/or a configuration and/or a measurements.

7. The transceiver of aspect 6, wherein the plurality of predefined threshold values is pre-defined, pre-configured or dynamically signaled.

8. The transceiver of aspect 7, wherein the predefined threshold values are dynamically signaled by the network which is preferably a eNB in LTE/LTE-A/LTE-A Pro/LTE evo or a gNB in NR, or any network entity from the EPC or network function (NF) proved by the 5G core network (5GC).

9. The transceiver of one of aspects 6 to 8, wherein the transceiver is configured for obtaining the plurality of thresholds from a list of thresholds having a plurality of indices associated with different values of the thresholds; or for storing a plurality of lists having a corresponding number of pluralities of threshold values and for using one of the plurality of lists during an instance of time.

10. The transceiver of one of aspects 3 to 9, wherein the transceiver is configured for supporting at least three resource priority classes and for classifying a future resource with regard to the at least three resource priority classes based on the usability of resources; and/or wherein the transceiver is configured for supporting at least two data priority classes and for classifying a future resource with regard to the at least two data priority classes based on the usability of resources.

11. The transceiver of aspect 10, wherein the transceiver is configured for associating a decreasing probability of utilization of resources with a higher priority class of data to be transmitted in a future resource.

12. The transceiver of one of previous aspects, wherein the transceiver is configured for transmitting data having one of a plurality of priority classes, for selecting a future resource from a plurality of future resources based on an estimated channel quality of the future resource and for selecting the future resource so as to have a channel quality based on the priority class, wherein the transceiver is configured to start from a threshold value associated with the channel quality to determine that no suitable future resource is available and to vary the threshold value until an amount of suitable future resources is available.

13. The transceiver of aspect 12, wherein the transceiver is configured for using a future resource having a channel quality better than the associated priority class only if no future resource with the associated priority class is available.

14. The transceiver of aspect 12 or 13, wherein the transceiver is configured for determining that no future resource with the associated priority class is available and to increase the threshold for the own transmission such that a higher level of channel quality falls within a search space and to search for a future resource with the associated priority class is available using the increased threshold.

15. The transceiver of aspect 14, wherein the transceiver is configured for varying the threshold by use of a step size that is one of a pre-defined step-size, a pre-configured step-size, a dynamically signaled step-size and a derivable step-size, preferably according to calculations and/or configurations.

16. The transceiver of aspect 14 or 15, wherein the transceiver is configured for varying the threshold value by deriving a new threshold value based on a calculation and/or a configuration and/or a measurement.

17. The transceiver of one of aspects 14 to 16, wherein the transceiver is configured for varying the threshold by use of a step size that is related to an absolute value of a channel quality measure or to an amount of resources additionally evaluated with the varied threshold.

18. The transceiver of aspect 17, wherein the quality measure comprises at least one of a
SNR=Signal to noise ratio
SINR=Signal to interference plus noise ratio
RSSI=Receives signal strength indicator
RSRP=Reference signal received power
RSRQ=Reference signal received quality
CSI=Channel state information
CQI=Channel quality information
RI=rank indicator
CBR=Channel busy ratio
Resource occupancy map
Availability (Probability of future utilization)
Expected interference 19. The transceiver of one of previous aspects, wherein the transceiver is configured for determining a channel quality measure so as to comprise at least one of a
SNR=Signal to noise ratio
SINR=Signal to interference plus noise ratio
RSSI=Receives signal strength indicator
RSRP=Reference signal received power
RSRQ=Reference signal received quality
CSI=Channel state information
CQI=Channel quality information
RI=rank indicator
CBR=Channel busy ratio
Resource occupancy map
Availability (Probability of future utilization)
Expected interference 20. The transceiver of one of previous aspects, wherein the transceiver is configured for determining a plurality of future resources to be suitable for the own transmission and for ranking the plurality of future resources based on a measure related to signal quality estimated for the future resources; and for selecting a future resource from the plurality of future resources based on the ranking.

21. The transceiver of aspect 20, wherein the transceiver is configured for selecting the future resource so as
to comprise a worst channel quality that is above a threshold value associated with a priority class of the own transmission; or
to be one of a subset of future resources having a worst channel quality that is above a threshold value associated with a priority class of the own transmission; and for selecting one of the subset based on a random selection or a weighted random selection.

22. The transceiver of one of previous aspects, wherein the transceiver is configured for ranking a plurality of future resources based on at least one of:
an occupancy of the resource during a plurality of past used resources;
a probability of occupancy/utilization of the resource based on the evaluation of a plurality of past resources; and
measurements of a combined total energy accumulated on the resource corresponding to the future resource during a past measurement period.

23. The transceiver of aspect 22, wherein the transceiver is configured for ranking the plurality of future resources based on the measurements of the combined total energy accumulated on the resource and for applying weights to the measurement that decreases with an age of the measurement.

24. Transceiver of one of previous aspects, wherein the transceiver is configured for using an utilization information indicating the utilization for scheduling the own transmission as periodic transmission.

25. The transceiver of one of previous aspects, wherein the transceiver is configured for scheduling an aperiodic transmission in a current resource based on the usability of the resources and for performing a short-term sensing in the current resource.

26. The transceiver of aspect 25, wherein the transceiver is configured for determining that an amount of resources required for the own transmission exceeds the current amount of resources and for selecting the current resource such that an adjacent future resource is additionally estimated to be available and for using the future resource and the adjacent future resource for the own transmission.

27. The transceiver of aspect 25 or 26, wherein the transceiver is configured for performing the short-term sensing prior to a transmission and during a listening period, and for scheduling the own transmission so as to transmit control data and payload data and for transmitting the control data directly or immediately after the listening period;

for scheduling the own transmission for a future, subsequent resource and for transmitting, in the current resource reservation information for reserving the future resource; or for scheduling the own transmission so as to transmit control data and payload data and for transmitting the control data within the future resource and an adjacent future resource used for the same transmission.

28. {long-term and short-term sensing on different analog digital conversion chips, e.g. separate transceiver branches with different AGCs} The transceiver of one of previous aspects, wherein the transceiver is configured for performing short-term sensing and/or long-term sensing on a first receiver branch using a first automatic gain control (AGC), and for performing the long-term sensing and/or the short-term sensing on a second receiver branch using a second automatic gain control (AGC), with different AGC configurations.

29. The transceiver of aspect 28, wherein the transceiver is configured for using the first transceiver branch and the second transceiver branch for different frequencies; and/or for different spatial areas with respect to the transceiver.

30. The transceiver of one of previous aspects, wherein the determining of the utilization is based on at least one of an identification of a transceiver using the resource, a frequency resource or subchannel used by the transceiver using the resource and a resource used by the transceiver using the resource.

31. The transceiver of one of previous aspects, wherein the transceiver is configured for performing beamforming so as to cover, in a spatial domain, different spatial areas with respect to the transceiver.

32. The transceiver of one of previous aspects, wherein the transceiver is configured for decoding a data traffic so as to obtain an utilization information indicating the utilization to the channel; wherein the utilization information is a transceivers specific for transceivers transmitting on the channel.

33. A transceiver configured for communicating in a wireless communication network being operated so as to schedule communication in a communication channel being organized in a plurality of resources arranged in a time-frequency grid;
wherein the transceiver is configured for performing long-term sensing an utilization of the channel by decoding a control data transmitted on the channel;
estimating a usability of resources of the channel for an own transmission based on the decoding; and
scheduling the own transmission based on the usability of the resources.

34. A transceiver configured for communicating in a wireless communication network being operated so as to schedule communication in a communication channel being organized in a plurality of resources arranged in a time-frequency grid;
wherein the transceiver is configured for performing long-term sensing an utilization of the channel; for estimating a usability of resources of the channel for an own periodic transmission; and
wherein the transceiver is configured for performing short-term sensing an availability of the channel; for estimating a usability of a present resource for an own aperiodic transmission.

35. The transceiver of aspect 34, wherein the short term sensing is performed on a subset of resources based on the long-term sensing result.

36. A transceiver configured for communicating in a wireless communication network being operated so as to schedule communication in a communication channel being organized in a plurality of resources arranged in a time-frequency grid;
wherein the transceiver is configured for estimating, from an utilization of the channel, an amount of frequency resources available in a future resource and for selecting a future resource from a plurality of future resources based on the estimated amount; for transmitting the data with a priority; wherein the transceiver is configured for utilizing one of a plurality of threshold values for selecting the future resource, the plurality of threshold values associated with different priority classes.

37. A transceiver configured for communicating in a wireless communication network being operated so as to schedule communication in a communication channel being organized in a plurality of resources arranged in a time-frequency grid;
wherein the transceiver is configured for performing long-term sensing an utilization of the channel;
estimating a usability of resources of the channel for an own transmission; and
wherein the transceiver is configured for determining a plurality of future resources to be suitable for the own transmission and for ranking the plurality of future resources based on a measure related to a signal quality estimated for the future resources; and for selecting a future resource from the plurality of future resources based on the ranking.

38. Wireless communication network being operated so as to schedule communication in a communication channel being organized in a plurality of resources, the wireless communication network comprising:
at least one transmitter accessing the channel;
and at least one transceiver according to one of previous aspects.

39. A method for operating a transceiver configured for communicating in a wireless communication network being operated so as to schedule communication in a communication channel being organized in a plurality of resources arranged in a time-frequency grid, the method comprising:
estimating a usability of resources of the channel for an own transmission based on performing long-term sensing an utilization of the channel by decoding a control data transmitted in the channel and/or by performing power sensing of the channel; and
scheduling the own transmission based on the usability of the resources.

40. A method for operating a transceiver configured for communicating in a wireless communication network being operated so as to schedule communication in a communication channel being organized in a plurality of resources arranged in a time-frequency grid, the method comprising;
performing long-term sensing an utilization of the channel; for estimating a usability of resources of the channel for an own periodic transmission; and
performing short-term sensing an availability of the channel; for estimating a usability of a present resource for an own aperiodic transmission.

41. A method for operating a transceiver configured for communicating in a wireless communication network being operated so as to schedule communication in a communication channel being organized in a plurality of resources arranged in a time-frequency grid, the method comprising;

estimating, from an utilization of the channel, an amount of frequency resources available in a future resource and for selecting a future resource from a plurality of future resources based on the estimated amount for transmitting the data with a priority; and utilizing one of a plurality of threshold values for selecting the future resource, the plurality of threshold values associated with different priority classes.

42. A method for operating a transceiver configured for communicating in a wireless communication network being operated so as to schedule communication in a communication channel being organized in a plurality of resources arranged in a time-frequency grid;

performing long-term sensing an utilization of the channel;

estimating a usability of resources of the channel for an own transmission; and determining a plurality of future resources to be suitable for the own transmission and for ranking the plurality of future resources based on a measure related to signal quality estimated for the future resources; and selecting a future resource from the plurality of future resources based on the ranking.

43. A method for operating a transceiver configured for communicating in a wireless communication network being operated so as to schedule communication in a communication channel being organized in a plurality of resources arranged in a time-frequency grid, the method comprising:

performing long-term sensing an utilization of the channel by decoding a control data transmitted on the channel and/or by performing power-sensing on the channel;

estimating a usability of resources of the channel for an own transmission based on the decoding; and scheduling the own transmission based on the usability of the resources.

44. A computer readable digital storage medium having stored thereon a computer program having a program code for performing, when running on a computer, a method according to one of aspects 39 to 43.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

| ABBREVIATIONS | |
|---|---|
| V2X | Vehicle-to-Everything |
| 3GPP | Third Generation Partnership Project |
| D2D | Device-to-Device |
| ITS | Intelligent Transport Services |
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |

| ABBREVIATIONS | |
|---|---|
| CORESET | Control Resource Set |
| USS | UE-Specific Search Space |
| CSS | Common Search Space |
| RP | Resource Pool* |

The invention claimed is:

1. A transceiver configured for communicating in a wireless communication network being operated so as to schedule communication in a communication channel being organized in a plurality of resources arranged in a time-frequency grid;
wherein the transceiver is configured for estimating a usability of resources of the channel for an own transmission based on performing long-term sensing a utilization of the channel by decoding a control data transmitted in the channel and/or by performing power sensing of the channel; and
scheduling the own transmission based on the usability of the resources;
wherein the transceiver is configured for estimating, based on the utilization, an amount of resources available in a future time interval which may be one of a time slot and a transmission time interval, and for selecting, from the estimated amount, data to be transmitted that comprise a priority for which the estimated amount is suitable using the future resource; or
for selecting a future resource from a plurality of future resources based on the estimated amount for transmitting the data with a priority; or
for estimating the usability with regard to a spatial domain of the transceiver and for selecting a spatial domain according to the usability.

2. The transceiver of claim 1, wherein the transceiver is configured for decoding the control data and for acquiring, from the decoding, a duration information indicating a remaining duration of the data traffic; wherein the transceiver is configured for estimating the usability of the resources based on the duration information; and/or
wherein the transceiver is configured for acquiring, from the decoding and/or from the power sensing, a repetition information indicating a repetition pattern of the data traffic; wherein the transceiver is configured for estimating the usability of the resources based on the repetition information.

3. The transceiver of claim 1, wherein the transceiver is configured for selecting the future resource from the plurality of future resources based on the estimated amount, wherein the transceiver is configured for associating the priority with a minimum amount of available resources to be used and for selecting the future resource based on the minimum amount.

4. The transceiver of claim 1, wherein the transceiver is configured for utilizing one of a plurality of threshold values for selecting the future resource, the plurality of threshold values associated with different priority classes.

5. The transceiver of claim 4, wherein the transceiver is configured for acquiring the plurality of threshold values based on a formula or criterion that is based on at least one of a calculation and/or a configuration and/or a measurements.

6. The transceiver of claim 5, wherein the plurality of predefined threshold values is pre-defined, pre-configured or dynamically signaled.

7. The transceiver of claim 6, wherein the predefined threshold values are dynamically signaled by the network which may be an eNB in LTE/LTE-A/LTE-A Pro/LTE evo or a gNB in NR, or any network entity from the EPC or network function (NF) proved by the 5G core network.

8. The transceiver of claim 5, wherein the transceiver is configured for acquiring the plurality of thresholds from a list of thresholds comprising a plurality of indices associated with different values of the thresholds; or for storing a plurality of lists comprising a corresponding number of pluralities of threshold values and for using one of the plurality of lists during an instance of time.

9. The transceiver of claim 1, wherein the transceiver is configured for transmitting data comprising one of a plurality of priority classes, for selecting a future resource from a plurality of future resources based on an estimated channel quality of the future resource and for selecting the future resource so as to comprise a channel quality based on the priority class, wherein the transceiver is configured to start from a threshold value associated with the channel quality to determine that no suitable future resource is available and to vary the threshold value until an amount of suitable future resources is available.

10. The transceiver of claim 9, wherein the transceiver is configured for determining that no future resource with the associated priority class is available and to increase the threshold for the own transmission such that a higher level of channel quality falls within a search space and to search for a future resource with the associated priority class is available using the increased threshold.

11. The transceiver of claim 10, wherein the transceiver is configured for varying the threshold by use of a step size that is one of a pre-defined step-size, a pre-configured step-size, a dynamically signaled step-size and a derivable step-size, advantageously according to calculations and/or configurations.

12. The transceiver of claim 1, wherein the transceiver is configured for scheduling an aperiodic transmission in a current resource based on the usability of the resources and for performing a short-term sensing in the current resource.

13. The transceiver of claim 12, wherein the short term sensing is performed on a subset of resources based on the long-term sensing result.

14. The transceiver of claim 13, wherein the transceiver is configured for performing the short-term sensing prior to a transmission and during a listening period, and
for scheduling the own transmission so as to transmit control data and payload data and for transmitting the control data directly or immediately after the listening period;
for scheduling the own transmission for a future, subsequent resource and for transmitting, in the current resource reservation information for reserving the future resource; or
for scheduling the own transmission so as to transmit control data and payload data and for transmitting the control data within the future resource and an adjacent future resource used for the same transmission.

15. The transceiver of claim 12, wherein the transceiver is configured for determining that an amount of resources that may be used for the own transmission exceeds the current amount of resources and for selecting the current resource such that an adjacent future resource is additionally estimated to be available and for using the future resource and the adjacent future resource for the own transmission.

16. A transceiver configured for communicating in a wireless communication network being operated so as to schedule communication in a communication channel being organized in a plurality of resources arranged in a time-frequency grid;
- wherein the transceiver is configured for performing long-term sensing a utilization of the channel by decoding a control data transmitted on the channel;
- estimating a usability of resources of the channel for an own transmission based on the decoding; and
- scheduling the own transmission based on the usability of the resources;
- estimating, based on the utilization, an amount of resources available in a future time interval which may be one of a time slot and a transmission time interval, and selecting, from the estimated amount, data to be transmitted that comprise a priority for which the estimated amount is suitable using the future resource; or
- selecting a future resource from a plurality of future resources based on the estimated amount for transmitting the data with a priority; or
- estimating the usability with regard to a spatial domain of the transceiver and for selecting a spatial domain according to the usability.

17. A wireless communication network being operated so as to schedule communication in a communication channel being organized in a plurality of resources, the wireless communication network comprising:
- at least one transmitter accessing the channel;
- and at least one transceiver according to claim 1 or a transceiver configured for communicating in a wireless communication network being operated so as to schedule communication in a communication channel being organized in a plurality of resources arranged in a time-frequency grid;
- wherein the transceiver is configured for performing long-term sensing a utilization of the channel by decoding a control data transmitted on the channel;
- estimating a usability of resources of the channel for an own transmission based on the decoding; and
- scheduling the own transmission based on the usability of the resources;
- estimating, based on the utilization, an amount of resources available in a future time interval which may be one of a time slot and a transmission time interval, and selecting, from the estimated amount, data to be transmitted that comprise a priority for which the estimated amount is suitable using the future resource; or
- selecting a future resource from a plurality of future resources based on the estimated amount for transmitting the data with a priority; or
- estimating the usability with regard to a spatial domain of the transceiver and for selecting a spatial domain according to the usability.

18. A non-transitory digital storage medium having stored thereon a computer program comprising a program code for performing, when running on a computer, a method for operating a transceiver configured for communicating in a wireless communication network being operated so as to schedule communication in a communication channel being organized in a plurality of resources arranged in a time-frequency grid, the method comprising:
- estimating a usability of resources of the channel for an own transmission based on performing long-term sensing a utilization of the channel by decoding a control data transmitted in the channel and/or by performing power sensing of the channel; and
- scheduling the own transmission based on the usability of the resources;
- estimating, based on the utilization, an amount of resources available in a future time interval which may be one of a time slot and a transmission time interval, and selecting, from the estimated amount, data to be transmitted that comprise a priority for which the estimated amount is suitable using the future resource; or
- selecting a future resource from a plurality of future resources based on the estimated amount for transmitting the data with a priority; or
- estimating the usability with regard to a spatial domain of the transceiver and for selecting a spatial domain according to the usability.

* * * * *